United States Patent
Xu et al.

(10) Patent No.: US 10,437,314 B2
(45) Date of Patent: Oct. 8, 2019

(54) DETECTING WEARING STATE OF WEARABLE DEVICES USING BODY CAPACITANCE

(71) Applicants: Anhui Huami Information Technology Co.,Ltd., Hefei, Anhui (CN); Huami Inc., Mountain View, CA (US)

(72) Inventors: Yurong Xu, Mountain View, CA (US); Baitao Lyu, Anhui (CN); Jun Yang, Mountain View, CA (US); Yajun Zhao, Anhui (CN)

(73) Assignees: Anhui Huami Information Technology Co., Ltd., Hefei (CN); Huami Inc., Mountain View, CA (US)

( * ) Notice: Subject to any disclaimer, the term of this patent is extended or adjusted under 35 U.S.C. 154(b) by 252 days.

(21) Appl. No.: 15/365,430

(22) Filed: Nov. 30, 2016

(65) Prior Publication Data

US 2018/0150126 A1 May 31, 2018

(51) Int. Cl.
*G06F 1/3287* (2019.01)
*G06F 11/30* (2006.01)
(Continued)

(52) U.S. Cl.
CPC ............ *G06F 1/3287* (2013.01); *G01P 13/00* (2013.01); *G06F 1/3212* (2013.01);
(Continued)

(58) Field of Classification Search
CPC ............ G06F 11/3037; G06F 11/3051; G06F 11/3438; G06F 1/3287; G06F 1/3212; G01P 13/00
See application file for complete search history.

(56) References Cited

U.S. PATENT DOCUMENTS

| 8,405,408 B2 | 3/2013 | Ootaka |
| 9,176,597 B2 | 11/2015 | Soo et al. |

(Continued)

FOREIGN PATENT DOCUMENTS

WO 2013075270 A1 5/2013

*Primary Examiner* — Jaweed A Abbaszadeh
*Assistant Examiner* — Gayathri Sampath
(74) *Attorney, Agent, or Firm* — Young Basile Hanlon & MacFarlane, P.C.

(57) ABSTRACT

Systems, methods, and detection apparatuses, for the detection of body capacitance, such as the capacitance of a human body, are disclosed. A detection apparatus determines an electronic signal characteristic of one or more electrodes. The electronic signal characteristic can be based on a voltage. Responsive to the electronic signal characteristic being within a predetermined electronic signal characteristic range, a charging mode is activated. Responsive to the electronic signal characteristic of the one or more electrodes being outside the predetermined electronic signal characteristic range, a capacitance detection mode is activated. The capacitance detection mode includes: determining a capacitance value of the one or more electrodes in which the capacitance value is based on a frequency of change in a capacitance associated with the one or more electrodes. Responsive to the capacitance of the one or more electrodes exceeding a capacitance threshold, activating a wearable mode.

16 Claims, 7 Drawing Sheets

(51) Int. Cl.
  *G01P 13/00* (2006.01)
  *G06F 11/34* (2006.01)
  *G06F 1/3212* (2019.01)

(52) U.S. Cl.
  CPC ...... *G06F 11/3037* (2013.01); *G06F 11/3051* (2013.01); *G06F 11/3438* (2013.01)

(56) References Cited

U.S. PATENT DOCUMENTS

| | | |
|---|---|---|
| 9,236,861 B2 | 1/2016 | Soo et al. |
| 9,258,026 B2 | 2/2016 | Chang et al. |
| 2009/0284496 A1* | 11/2009 | Oki ................. G06F 3/0346 345/174 |
| 2013/0106779 A1* | 5/2013 | Company Bosch .. G06F 3/0418 345/174 |
| 2013/0119255 A1 | 5/2013 | Dickinson et al. |
| 2014/0239980 A1* | 8/2014 | Ootaka ................. B60N 2/002 324/679 |
| 2015/0057964 A1* | 2/2015 | Albinali ................. G01P 13/00 702/141 |
| 2016/0038055 A1 | 2/2016 | Wheeler et al. |
| 2016/0154952 A1 | 6/2016 | Venkatraman et al. |

\* cited by examiner

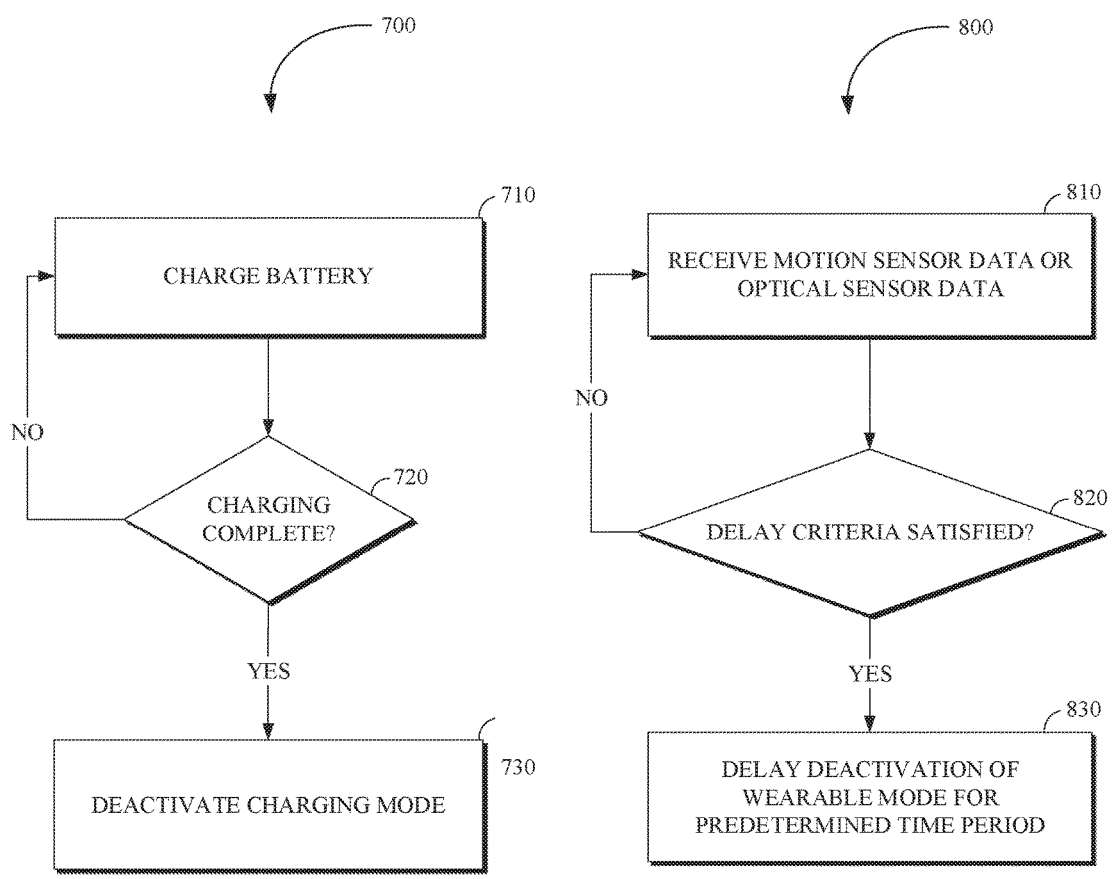

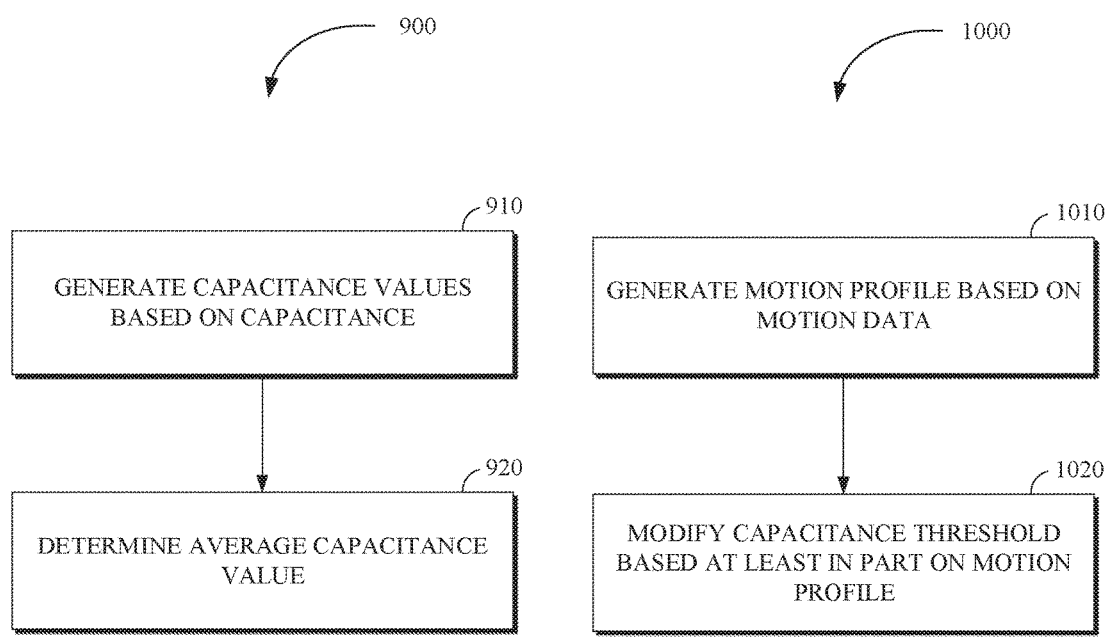

DETECTING WEARING STATE OF WEARABLE DEVICES USING BODY CAPACITANCE

TECHNICAL FIELD

The present disclosure relates in general to methods, apparatuses, and systems for the detection of wearing state based on body capacitance.

BACKGROUND

The popularity and proliferation of wearable devices can be attributed, at least in part, to the convenience of having an electronic device that is usually close at hand. However, wearable devices often have a limited battery life that necessitates frequent, sometimes lengthy, recharging. Further, for the sake of personal comfort and hygiene, wearable devices are often regularly removed from the body. Accordingly, the wearable devices spend a non-trivial amount of time not being worn and it would be convenient to have a way to distinguish those occasions when the wearable devices are being worn and performing the functions associated with the wearable device from those occasions when the wearable devices is not worn and can be fulfilling some other functionality.

SUMMARY

Disclosed herein are aspects of implementations of methods, apparatuses, and systems for the detection of body capacitance.

In an aspect, a method for detecting capacitance comprises: determining, by a detection apparatus, an electronic signal characteristic of one or more electrodes; responsive to the electronic signal characteristic being within a predetermined electronic signal characteristic range, activating, by the detection apparatus, a charging mode; responsive to the electronic signal characteristic of the one or more electrodes being outside the predetermined electronic signal characteristic range, activating, by the detection apparatus, a capacitance detection mode, wherein the capacitance detection mode includes: determining, by the detection apparatus, a capacitance value of the one or more electrodes, wherein the capacitance value is based on a frequency of change in a capacitance associated with the one or more electrodes; and responsive to the capacitance value of the one or more electrodes exceeding a capacitance threshold, activating, by the detection apparatus, a wearable mode.

In another aspect, a capacitance detection apparatus, comprising: one or more sensors configured to detect motion and electronic signal characteristics; a memory and a processor configured to execute instructions stored in the memory to: determine an electronic signal characteristic of one or more electrodes; responsive to the electronic signal characteristic being within a predetermined electronic signal characteristic range, activate a charging mode; and responsive to the electronic signal characteristic of the one or more electrodes being outside the predetermined electronic signal characteristic range, activate a capacitance detection mode, wherein the capacitance detection mode includes: determine a capacitance value of the one or more electrodes, wherein the capacitance value is based on a frequency of change in a capacitance associated with the one or more electrodes; and responsive to the capacitance value of the one or more electrodes exceeding a capacitance threshold, activate a wearable mode.

In another aspect, capacitance detection system, comprising: a computing device; and a wearable detection apparatus comprising a sensor configured to detect electronic signal characteristics, a communication component configured to exchange signal data with the computing device, a memory, and a processor configured to execute instructions stored in the memory to: determine an electronic signal characteristic of one or more electrodes; responsive to the electronic signal characteristic being within a predetermined electronic signal characteristic range, activate a charging mode; and responsive to the electronic signal characteristic of the one or more electrodes being outside the predetermined electronic signal characteristic range, activate a capacitance detection mode, wherein the capacitance detection mode includes: determine a capacitance value of the one or more electrodes, wherein the capacitance value is based on a frequency of change in a capacitance associated with the one or more electrodes; and responsive to the capacitance value of the one or more electrodes exceeding a capacitance threshold, activate a wearable mode.

Details of these implementations, modifications of these implementations and additional implementations are described below.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart showing an implementation of a process for deactivating a charging mode according to implementations of this disclosure.

FIG. 8 is a flowchart showing an implementation of a process for delaying deactivation of a wearable mode according to implementations of this disclosure.

FIG. 9 is a flowchart showing an implementation of a process for detecting body capacitance including the use of average capacitance values.

FIG. 10 is a flow diagram showing an example of a process for modifying a capacitance threshold according to implementations of this disclosure.

DETAILED DESCRIPTION

In recent times, the popularity of wearable devices has greatly increased and wearable devices are now being used for a variety of applications including health and fitness tracking. Traditionally, the measurement of health indicators, including heart rate, can be initiated manually (e.g., a user interacting with a heart rate measurement control to activate a heart rate monitoring sensor). However, manual operation is inconvenient since the user must remember to activate the control, and perform some series of steps before the measurements begin. Furthermore, aside from requiring additional work by the user, for certain applications such as sleep monitoring, it is not practical to require a user to manually activate the wearable device.

As such, a user can further maximize the benefits of using the wearable device when the wearable device itself is able to determine its own state, including when the wearable device is being worn by the user and when the wearable device has been set aside after being worn. Further, distinguishing the state in which the wearable device is worn from the state in which the wearable device is not being worn can improve battery utilization and result in more accurate health and fitness monitoring.

With respect to determining when the wearable device is being worn, in applications like sleep monitoring the proximity of the wearable device to a user's skin and the differences between individuals (e.g., different galvanic skin responses), can make detection of wearable state challenging.

Moreover, wearable devices are often battery powered and often need to be charged, which usually necessitates removal of the wearable device from the user in order to establish a connection with a charging device such as a battery charger.

Accordingly, there is a need for a way to determine: when a wearable device is being worn by a user; when the wearable device is attached to a charging device; and seamlessly transition between a charging mode to charge the wearable device and a capacitance detection mode to detect body capacitance and activate a wearable mode when body capacitance is detected.

The methods, apparatuses, and systems of the present disclosure address ways of dealing with problems particular to the field of body sensing, including the use of a detection apparatus to facilitate the determination of when a wearable device is in contact with a human body. Further, the disclosed technology also addresses problems particular to the fields of electronic signal characteristic detection, including capacitance detection and voltage detection.

Figure 1:
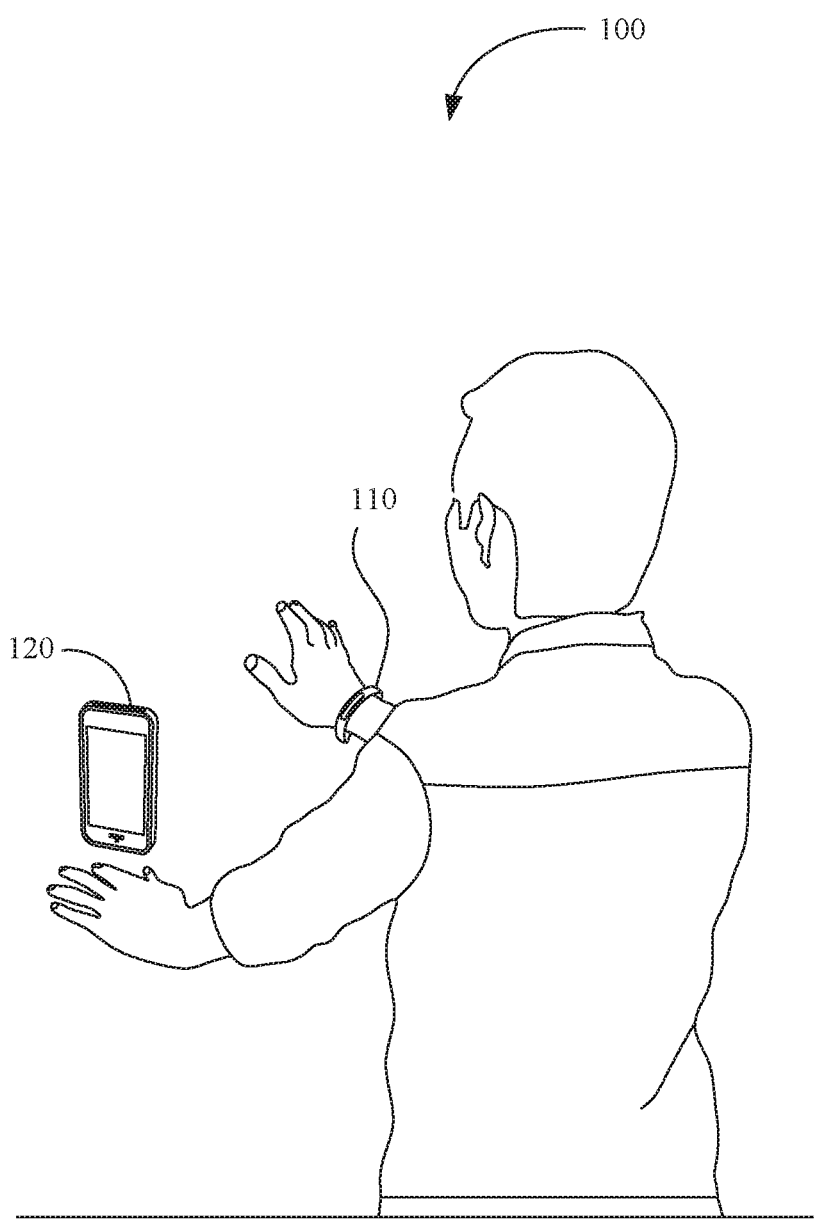
FIG. 1 is an illustration showing an implementation of a body capacitance detection apparatus in use.

FIG. 1 is a diagram of an implementation of a wearable system 100 which can include a wearable apparatus 110 worn by an individual and a device core 120. The wearable apparatus 110 can include a housing that is in the form of a ring, bracelet, wristband, pendant, armband, anklet, headband, belt, necklace, glove, a chest patch, or other mechanism for securing or attaching the wearable apparatus 110 to a human body.

According to an implementation, the wearable apparatus 110 can include one or more processing cores (not shown) that are configured to receive signals from sensors (not shown) that can include one or more electrodes, to detect an electronic signal characteristic, including voltage or capacitance (e.g. the capacitance of a human body to which the wearable apparatus 110 is secured, in contact with, or in close proximity to). The wearable apparatus 110 can include an electronic signal characteristic component (not shown) that includes a voltage detection component, such as a voltage detection circuit, that can include multiple electrodes for measuring voltage (electric potential difference) that can be used to determine when an electronic device is in contact with one of the electrodes. Further, the electronic signal characteristic component in the wearable apparatus 110 can include a capacitance detection component, including a capacitance detection circuit (CDC) that can detect capacitance including a capacitance of a human body.

Further, the wearable apparatus 110 can exchange (send or receive) data with a remote data source. For example, an identity profile of a user, which can be used to uniquely identify the user, can be sent to a remote cloud server where the measurements can be stored for later retrieval and use.

Though illustrated as a single device, the wearable apparatus 110 can be part of a wearable system 100 which can include multiple devices including a device such as the device core 120 which can be used to exchange data with the wearable apparatus 110 or with a remote computing device such as a server device (not shown) that can store electronic signal characteristic data, including voltage data, and capacitance data.

As an example, the wearable apparatus 110 can include a chest patch (not shown), which can be attached to the chest of the individual, and a device core 120 which can be attached and removed from the chest patch. The chest patch can be, for example, an adhesive patch, a sticker, or the like. When attached to the chest of the individual, the first electrode of the ECG sensor on the interior surface facing the skin of the individual can be in contact with the skin of in the area of the chest of the individual, which can form the lead to generate the electronic signals for wearable state measurements including body capacitance measurements.

Further, when the wearable mode is activated, the wearable apparatus 110 can, for example, monitor sleep, count steps, or determine heart related measurements such as heart rate variability (HRV).

Figure 2:
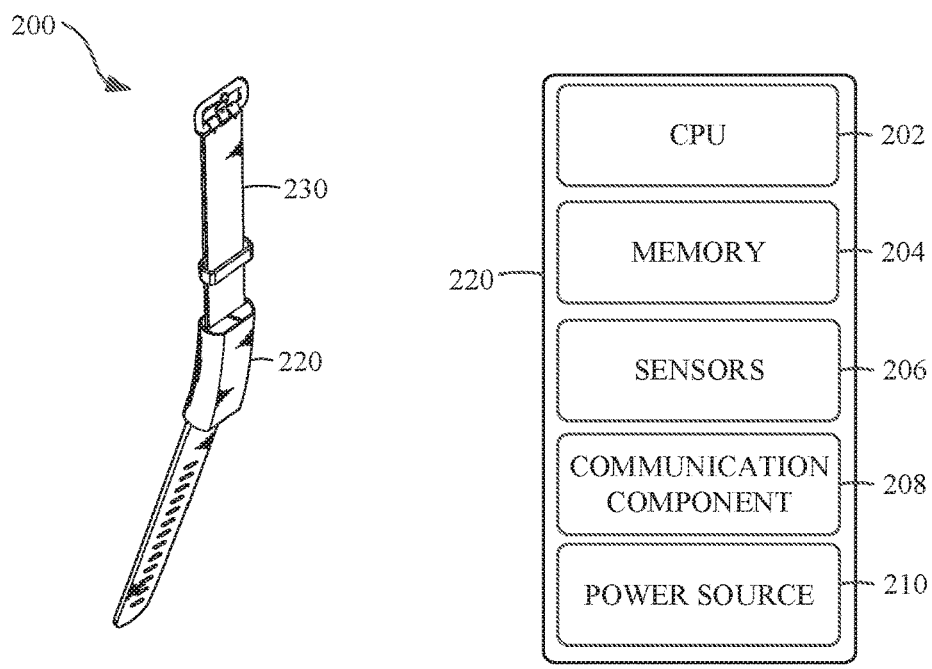
FIG. 2 is a diagram of an implementation of a body capacitance detection apparatus usable within implementations of the disclosure.

FIG. 2 is a diagram of an implementation of a wearable apparatus 200 usable within implementations of the disclosure. The wearable apparatus 200 can be a wearable device such as the wearable apparatus 110 discussed above with respect to FIG. 1. As an example, the wearable apparatus 200 can include a device core 220 and one or more accessory components including a housing, such as a band 230 or a chest patch (not shown).

In some implementations, the device core 220 can include a central processing unit (CPU) 202, a memory 204, sensors 206, and a communications component 208. The CPU 202 can include single or multiple processors each having single or multiple processing cores. Alternatively, the CPU 202 can include another type of device, or multiple devices, capable of manipulating or processing data.

The memory 204 can comprise random access memory device (RAM) or any other suitable type of storage device such as a non-transitory computer readable memory. The memory 204 can include executable instructions and data that can be accessed by the CPU 202, for example, data generated or processed in signals received from the sensors 206. The memory 204 can include one or more DRAM modules such as double data rate synchronous dynamic random-access memory (DDR SDRAM). The memory 204 can include another type of device, or multiple devices, capable of storing data for retrieval or processing by the CPU 202. The CPU 202 can access and manipulate data in stored in the memory 204 via a bus.

The sensors 206 can include one or more sensors that can be disposed on any part of the wearable apparatus 200. The sensors 206 can be used to identify, detect, determine, or generate signal data indicative of measurements (e.g., electrical activity or motion) associated with wearable apparatus 200 or an individual wearing the wearable apparatus 200.

The sensors 206 can include one or more sensors used to detect the state or condition of an environment, including capacitance sensors, voltage sensors, electromyography sensors, accelerometers, gyroscopes, optical sensors, light emitters, microphones, or touch sensors. The accelerometers can include various numbers of axes including a three-axis, a six-axis, or a nine-axis accelerometer. The optical sensors can include RGB cameras, infrared cameras, monochromatic infrared cameras, or any other optical sensor that can capture still images or moving images. The light emitters can be infrared light emitting diodes (LED), infrared lasers, or any other suitable lights. The sensors 206 can include one or more sensors that can generate wearable state signals (e.g., signals indicating that the wearable apparatus 200 is being worn) based on electronic signal characteristics detected by sensors including a capacitive sensor, a galvanic skin response (GSR) sensor, an electroencephalogram (EEG) sensor, a photoplethysmogram (PPG) sensor, an electromyogram (EMG) sensor, or the like.

For example, the capacitive sensor can comprise a first electrode arranged in an interior surface of device core 220, which can be positioned to be in contact with the skin of an individual when worn, and a second electrode arranged in an exterior surface of the device core 220. The sensors 206 can include sensors capable of generating biometric signals, such as capacitive signals, through non-invasive techniques which do not penetrate or contact the skin of the individual.

The sensors 206 can also comprise one or more bioimpedance sensors, microphones, temperature sensors, touch screens, finger readers, iris scanners, a combination of the above, or the like. Implementations of the sensors 206 can include a single sensor, one of each of the foregoing sensors, or any combination of the foregoing sensors. In some implementations, the signal data can be identified, detected, determined, or otherwise generated based on any single sensor or combination of sensors included in the wearable apparatus 200.

The communications component 208 can be a hardware or software component configured to communicate data, such as measurements of vital signs, from the sensors 206 to one or more external devices, such as another wearable device or a computing device, for example. In some implementations, the communications component 208 comprises an active communication interface, for example, a modem, transceiver, transmitter-receiver, or the like. In some implementations, communications component 208 comprises a passive communication interface, for example, a quick response (QR) code, Bluetooth identifier, radio-frequency identification (RFID) tag, a near-field communication (NFC) tag, or the like. The communication component 208 can operate over wired or wireless communication connections, such as, for example, a wireless network connection, a Bluetooth connection, an infrared connection, an NFC connection, a cellular network connection, a radio frequency connection, or any combination thereof. In some implementations, the communication component 208 can use sound signals as input and output, such as, for example, an ultrasonic signal or a sound signal via an audio jack. Implementations of the communications component 208 can include a single component, one of each of the foregoing types of components, or any combination of the foregoing components.

The power source 210 can be any source providing electrical power to some or all components of the wearable apparatus 200. The power source 210 can include an internal power source, an external power source, or any combination thereof. The internal power source can include a rechargeable or non-rechargeable battery, such as, for example, a lithium-ion (Li-ion) battery, a nickel-cadmium (NiCd) battery, a nickel metal hydride battery, a dry-cell battery, a button/coin battery, an alkaline battery, a lithium battery, a mercury battery, a silver oxide battery, a zinc air battery, or any combination thereof. The external power source can include a wired power source or a wireless power source, such as, for example, a power cord, an inductive charging device, a solar panel power source, or any combination thereof. In some implementations, the power source 210 can include a rechargeable battery and a battery charging circuit.

The wearable apparatus 200 can also include other components not shown in FIG. 2. For example, the wearable apparatus 200 can include one or more input/output devices, such as a display. In some implementations, the display can be coupled to the CPU 202 via a bus. In some implementations, other output devices can be included in addition to or as an alternative to the display. When the output device is or includes a display, the display can be implemented in various ways, including by an LCD, CRT, LED, OLED, or other device capable of displaying a still or moving image. In some implementations, the display can be a touch screen display configured to receive touch-based input, for example, in manipulating data output to the display.

Figure 3:
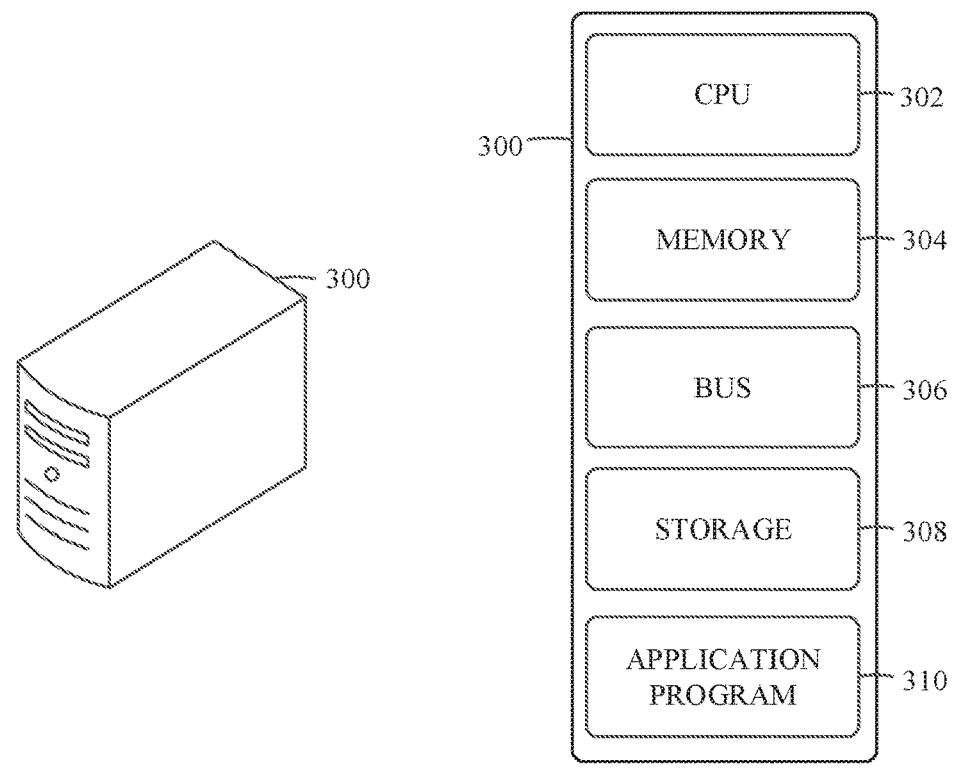
FIG. 3 is a diagram of an implementation of a computing device usable within implementations of the disclosure.

FIG. 3 shows a computing device 300 and a block diagram of a hardware configuration of the computing device 300 according to implementations of this disclosure. Computing device 300 can be a part of the system for body capacitance detection disclosed herein. In some implementations, the computing device 300 and the wearable apparatus 200 (or any device having measurement capabilities) can be the same device. The computing device 300 can be shown as an example type of the computing device 300 in FIG. 3, and is not limited to any specific type or any specific quantity in the system disclosed herein.

The computing device 300 can be implemented by any configuration of one or more computers, such as a microcomputer, a mainframe computer, a super computer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, e.g., a smart watch, or a computing service provided by a computing service provider, e.g., a website, or a cloud service provider. In some implementations, the computing device 300 can be a smart phone device that can be used to display and analyze signals from a wearable device. For example, the signals from the wearable device can include data indicating health or fitness indicators such as a heart rate, number of steps taken, or sleep duration. In some implementations, certain operations described herein can be performed by a computer (e.g., a server computer) in the form of multiple groups of computers that are at different geographic locations and can or cannot communicate with one another by way of, such as, a network. While certain operations can be shared by multiple computers, in some implementations, different computers can be assigned with different operations.

The computing device 300 can include at least one processor such as the CPU 302. CPU 302 as well as the CPU 202 can be any type of device, or multiple devices, capable of manipulating or processing information. Although the examples herein can be practiced with a single processor as shown, advantages in speed and efficiency can be achieved using more than one processor. CPU 302 can be distributed across multiple machines or devices (each machine or device having one or more of processors) that can be coupled directly or across a local area or other network. Although the examples herein can be practiced with a single processor as shown, advantages in speed and efficiency can be achieved using more than one processor.

The memory 304 as well as memory 204 can be, for example, a random access memory device (RAM), a read-only memory device (ROM), an optical disc, a magnetic disc, or any other suitable type of storage device, and can store code and data that can be accessed by CPU 302 using a bus 306. Although one of the bus 306 is depicted, multiple buses can be utilized. The memory 304 can be distributed across multiple machines or devices such as network-based memory or memory in multiple machines performing operations that can be described herein as being performed using a single computing device for ease of explanation. The code can include an operating system and one or more application program 310 processing and/or outputting the data. As will be discussed in detail below, the application program 310 can include software components in the form of computer executable program instructions that cause the CPU 302 to perform some or all of the operations and methods described herein. In some implementations, the computing device 300 is used to implement computing device 300 or at least an analysis component of the computing device 300, in which application program 310 stored by memory 304 can implement some or all of the processes as described in more detail below. The application program 310 can include a user interface (UI), such as, for example, a screen or a button.

The computing device 300 can optionally include a storage device 308 in the form of any suitable non-transitory computer readable medium, such as a hard disc drive, a memory device, a flash drive or an optical drive. The storage device 308, when present, can provide additional memory when high processing requirements exist. The storage device 308 can also store any form of data, relating or not relating to cardiac information. Further, storage device can be a component of the computing device 300 or can be a shared device that is accessed via a network.

The computing device 300 can include more devices or components. For example, computing device can further include one or more input devices, output devices, communication devices, or any other device that can be used to transmit, store, process, and present data.

Although FIG. 3 depicts a hardware configuration that can implement a computing device 300, other configurations can be utilized. The hardware configuration of a computing system as depicted in an example in FIG. 3 thus can be implemented in a wide variety of configurations.

Figure 4:
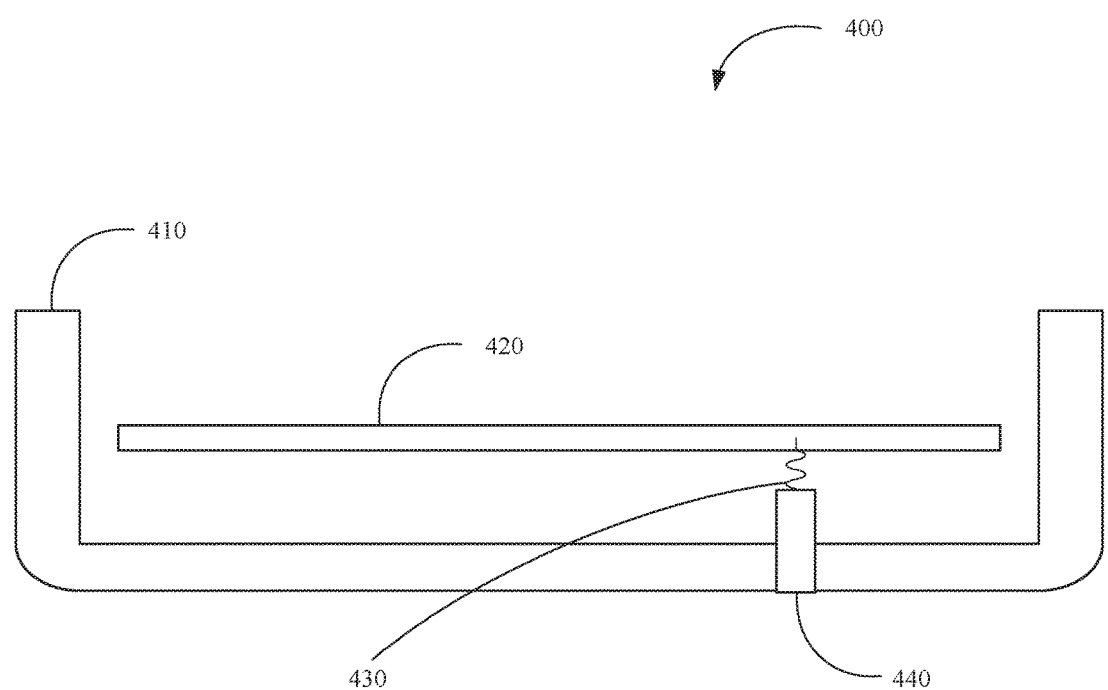
FIG. 4 is a cross-sectional diagram of an example of an apparatus using sensors to detect body capacitance according to implementations of this disclosure.

FIG. 4 is a cross-sectional diagram of a capacitance detection apparatus 400. In some implementations, the capacitance detection apparatus 400 can include some or all of the features of a device or apparatus including at least one of: the wearable apparatus 110, shown in FIG. 1, the wearable apparatus 200 shown in FIG. 2, and the computing device shown in FIG. 3. As illustrated, the capacitance detection apparatus 400 includes: a housing 410; a circuit board 420; a line 430; and an electrode 440.

The housing 410 can include some or all of the circuit board 420 and can include one or more apertures in which part or all of the electrode 440 can be located.

The circuit board 420 can include a printed circuit board that can be configured to accommodate various components including the components disclosed in FIGS. 1-2. For example, the circuit board 420 can include components such as an electronic signal characteristic sensor including any of a voltage sensor and a capacitance sensor. In some implementations, the circuit board 420 can be a flexible printed circuit (FPC).

The line 430 can include a line, such as a conductive material, through which a signal, such as an electrical signal, can be transmitted. The line can be connected to various components including, as illustrated in FIG. 4, the electrode 440 and the circuit board 420.

The electrode 440 can include one or more electrodes through which a signal, such as an electrical signal, can be transmitted. In some implementations, the electrode 440 can be positioned at various locations on the apparatus (e.g. on the rear or side of the apparatus) in order to reduce interference from non-body capacitance sources. In some implementations, preventing incorrect activation of the wearable mode caused by conductive material (e.g., water drops), multiple electrodes can be used. For example, if two electrodes are placed on two separate back locations of the apparatus, by cross-checking outputs from the two electrodes, the incorrect activation can be reduced and the accuracy of correct wearable mode activation can be improved.

Further, an FPC electrode can be attached to a position inside a back cover of the apparatus (e.g., a smartwatch). In some implementations, the electrode 440 can use a combination of the existing electrodes and the new electrodes.

In this example, the electrode 440 is connected to the line 430. The electrode can be in various configurations with respect to other components including at least one of: connected to more than one line; and connected directly to the circuit board 420. Further, though a single one of the electrode 440 is illustrated in FIG. 4, the capacitance detection apparatus 400 can include multiple electrodes which can be connected to the circuit board 420 by one or more lines including the line 430.

In an implementation, one or more electrodes, such as the electrode 440, can be located inside an enclosure, such as the housing 410. Further, within the housing 410, the electrode 440 can be wholly or partially isolated from coming into contact with a source of an electronic signal, including a voltage (e.g., from a charging cable) or capacitance (e.g., from human skin). For example, the electrode 440 can be lodged in the aperture of the housing 410 or separated from contact with objects (such as skin) outside the housing 410 by the structure of the housing 410 itself. In some implementations, the some or all of the capacitance detection apparatus 400 can be located inside of an enclosure or housing of the capacitance detection apparatus 400.

Figure 5:
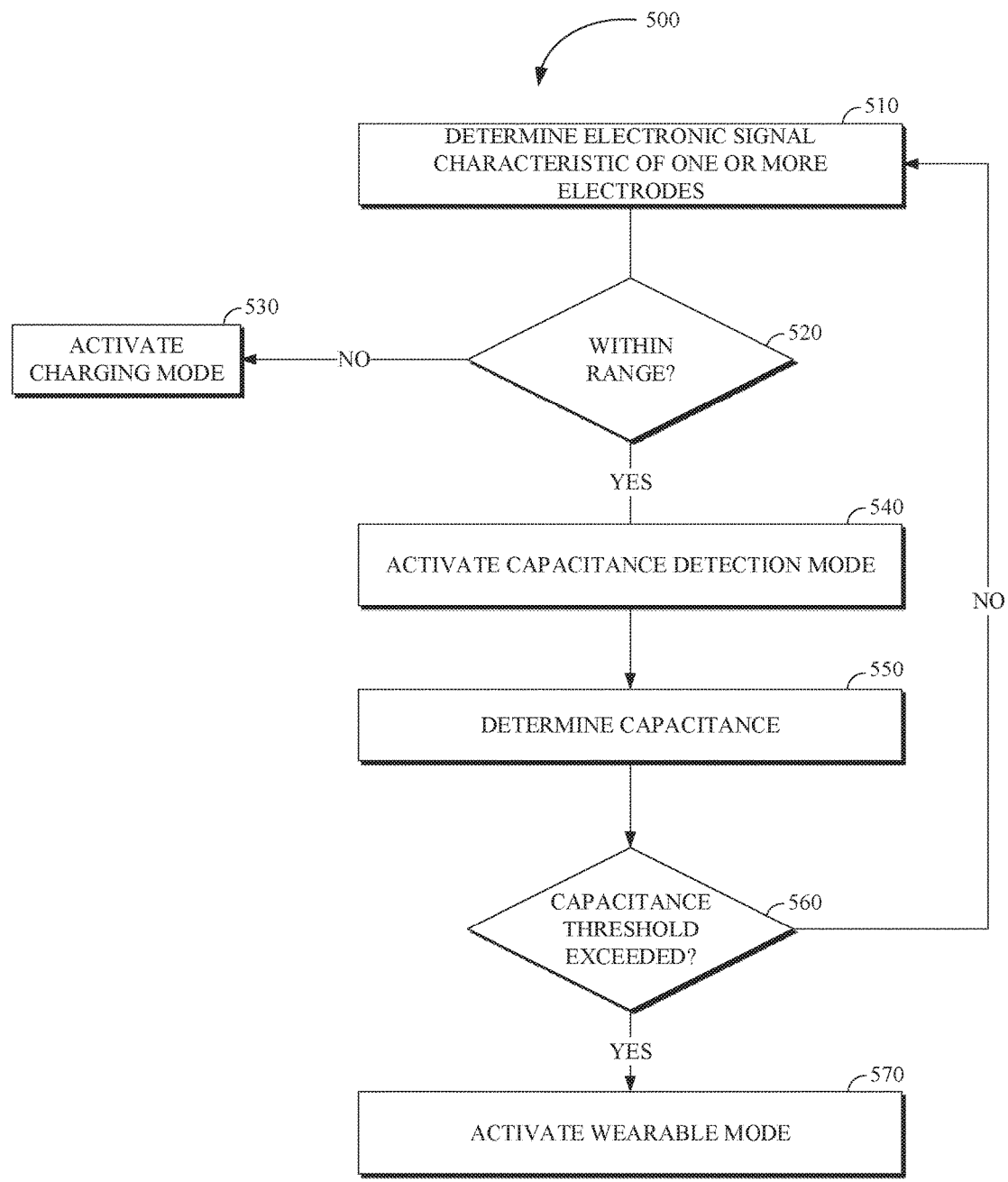
FIG. 5 is a flowchart showing an implementation of a process for detecting body capacitance according to implementations of this disclosure.

FIG. 5 is a flow diagram showing an example of a process 500 for detection of capacitance. In some implementations, some or all of the process 500 can be implemented in a device or apparatus including at least one of: the wearable apparatus 110, shown in FIG. 1, the wearable apparatus 200 shown in FIG. 2, and the computing device 300 shown in FIG. 3.

At operation 510, an electronic signal characteristic of one or more electrodes is determined. The electronic signal characteristic can be based on a characteristic (e.g. magnitude, frequency) of an electronic signal which can include any of voltage and capacitance. Further, the electronic signal characteristic can be based on patterns, attributes, or properties of one or more electronic signals, which can include different types of electronic signals. Determination of the electronic signal characteristic can be based on one or more signals that contact the one or more electrodes. The one or more electrodes in operation 510 can be one or more existing electrodes of a wearable apparatus, such as, for example, one or more USB electrodes that connects to a circuit (e.g., a charging circuit or a communication circuit). The electronic signal characteristic of the one or more electrodes can include the electronic signal characteristic across the one or more electrodes (e.g. a voltage across the one or more electrodes). The electronic signal characteristic across the one or more electrodes can be measured by an electronic signal characteristic sensor (e.g., a voltage sensor including a resistance sensor) that detects signals, such as electric signals that contact the one or more electrodes. As an example, the resistance sensor can determine the timing of the signals between the one or more electrodes, thereby determining the electronic signal characteristic between the one or more electrodes.

In some implementations, the one or more electrodes can be connected to a switch which can be multiplexed so that different signals, including voltage signals and capacitance signals, can share a single line that is connected to the switch.

At operation 520, a determination of whether the electronic signal characteristic of the one or more electrodes is within a predetermined electronic signal characteristic range is made. In some implementations, the determined electronic signal characteristic can be compared to various electronic signal characteristic ranges and the one of the electronic signal characteristic ranges that most closely matches the determined electronic signal characteristic can be selected.

In some implementations, the signal passes through an electronic switch that is able to switch between different circuits including a charging circuit (which can be used upon activation of a charging mode) and a CDC (which can be used upon activation of a wearable mode). In some implementations, the electronic switch can be a multiplexed switch.

Based on a determination that the electronic signal characteristic of the one or more electrodes is outside the predetermined electronic signal characteristic range, the process 500 proceeds to operation 530. Based on a determination that the electronic signal characteristic of the one or more electrodes is within the predetermined electronic signal characteristic range, the process 500 proceeds to operation 540.

At operation 530, a charging mode is activated. The charging mode can include switching to a charging circuit that opens a gate between the electrode and a battery (e.g., a battery in the wearable apparatus 110). Opening the gate between the electrode and the battery permits a signal, such as an electrical current, to pass to the battery and thereby recharge the battery.

As an example, when the one or more electrodes are in contact with a power source, such as a battery or a capacitor, the electronic signal characteristic sensor can determine an electronic characteristic of the power source, including the voltage of the power source. For instance, a universal serial bus (USB) charging device can be rated at five volts. Accordingly, upon determining that the voltage is five volts, wearable apparatus 110 can determine that the electrical current being received is a USB signal and activate a charging mode that conducts the signal (e.g., an electrical signal) through the USB port to a battery.

In some implementations, an apparatus such as the wearable apparatus 110 can determine when the battery in the wearable apparatus 110 has been charged to a charge threshold level (e.g., fully charged) and can then deactivate the charging mode and return to a state, such as in operation 510, in which an electronic signal characteristic of the one or more electrodes is determined.

At operation 540, responsive to the electronic signal characteristic being within the predetermined electronic signal characteristic range, a capacitance detection mode is activated. In some implementations, activating the capacitance detection mode can include switching to a capacitance detection circuit that includes a capacitance detection sensor that is able to detect capacitance including the capacitance of a human body. The capacitance detection circuit can include a programmable current source, an analog comparator (e.g., a precision analog comparator), and an analog frontend that can be in contact with, or connect to, the one or more electrodes.

At operation 550, a capacitance value or capacitance values of the one or more electrodes is determined. The capacitance value can be based on a frequency of change in a capacitance associated with the one or more electrodes (e.g. detecting changes in the capacitance of skin in contact with the one or more electrodes).

As an example, when a portion of a human body, such as the skin, is in contact with the one or more electrodes, the capacitance value associated with the one or more electrodes (the capacitance values of the skin surface) can be measured in terms of counts (e.g., frequency) of capacitance changes per sensing cycle (e.g., a predetermined time period).

For example, a CDC can use a programmable current source to feed a varying current to the electrodes and the capacitance detection sensor. The output of the capacitance detection sensor, which can vary due to the varying current, can be fed to a Pulse Width Modulation (PWM) or a capacitance to duty cycle convertor that gates a clocked counter. The varying capacitance values can have cycles or time periods (e.g., sensing cycles), and the clocked counter can convert the varying capacitance into a digital output which can indicate counts of capacitance changes in each sensing cycle.

In some implementations, a capacitance detection sensor in a CDC can be used to detect capacitance and determine the magnitude of the capacitance value. As an example, the detection apparatus can determine a value of a capacitance in farads. The capacitance value can be detected through: direct contact with a source of capacitance, such as a part of a human body; detection of a source of capacitance that does not contact any part of an apparatus (e.g., the wearable apparatus 110) enclosing the one or more electrodes (e.g., a finger hovering over, but not touching, the one or more electrodes); and contact of an object with the enclosure of the wearable apparatus 110 that does not contact the one or more electrodes.

In some implementations, responsive to the capacitance value being determined to be unchanged for a predetermined time period, the process 500 can move to operation 510 and determine the electronic signal characteristic of the one or more electrodes. At operation 560, the wearable apparatus 110 determines whether the capacitance, based on the capacitance of the one or more electrodes, exceeds a capacitance threshold. In some implementations, the capacitance is compared to a capacitance threshold. As an example, responsive to determining a capacitance value of 110 farads, the value of 110 farads could be compared against a capacitance threshold value of 100. Accordingly, in the preceding example, the capacitance value would exceed the capacitance threshold value.

In some implementations, the capacitance threshold can be determined based on a comparison of capacitance values that can be used to determine a noise value. As an example, the wearable apparatus 110 can determine a first capacitance value based on a plurality of capacitance values in a first time period, and a second capacitance value based on a plurality of capacitance values in a second time period. Next, the wearable apparatus 110 can determine a noise value based on the difference between the first capacitance value and the second capacitance value. In the preceding example, the capacitance threshold can be based at least in part on the noise value. As an example, the noise can include electrical activity in the vicinity of the one or more electrodes that changes or disrupts the signals that cause capacitance to be detected by the capacitance detection sensor.

Responsive to a determination that the capacitance value exceeds the capacitance threshold, the process 500 proceeds to operation 570. Responsive to a determination that the capacitance value does not exceed the capacitance threshold, the process 500 returns to operation 510 and determines the electronic signal characteristic of the one or more electrodes. In some implementations, prior to returning to operation 510, the wearable apparatus 110 can deactivate the wearable mode.

In some implementations, responsive to the capacitance value not exceeding the capacitance threshold, prior to returning to operation 510, the capacitance value can be compared to a noise threshold. Comparison of the capacitance value to the noise threshold can be used to reduce adjust the capacitance threshold to account for noise (e.g., extraneous electrical activity that changes the capacitance values).

At operation 570, a wearable mode is activated. Activation of the wearable mode can include performing functions of, for example, the wearable apparatus 110, including running or operating one or more applications. For example, the wearable apparatus 110, when in wearable mode, can perform heart rate monitoring, step counting, or sleep tracking.

Figure 6:
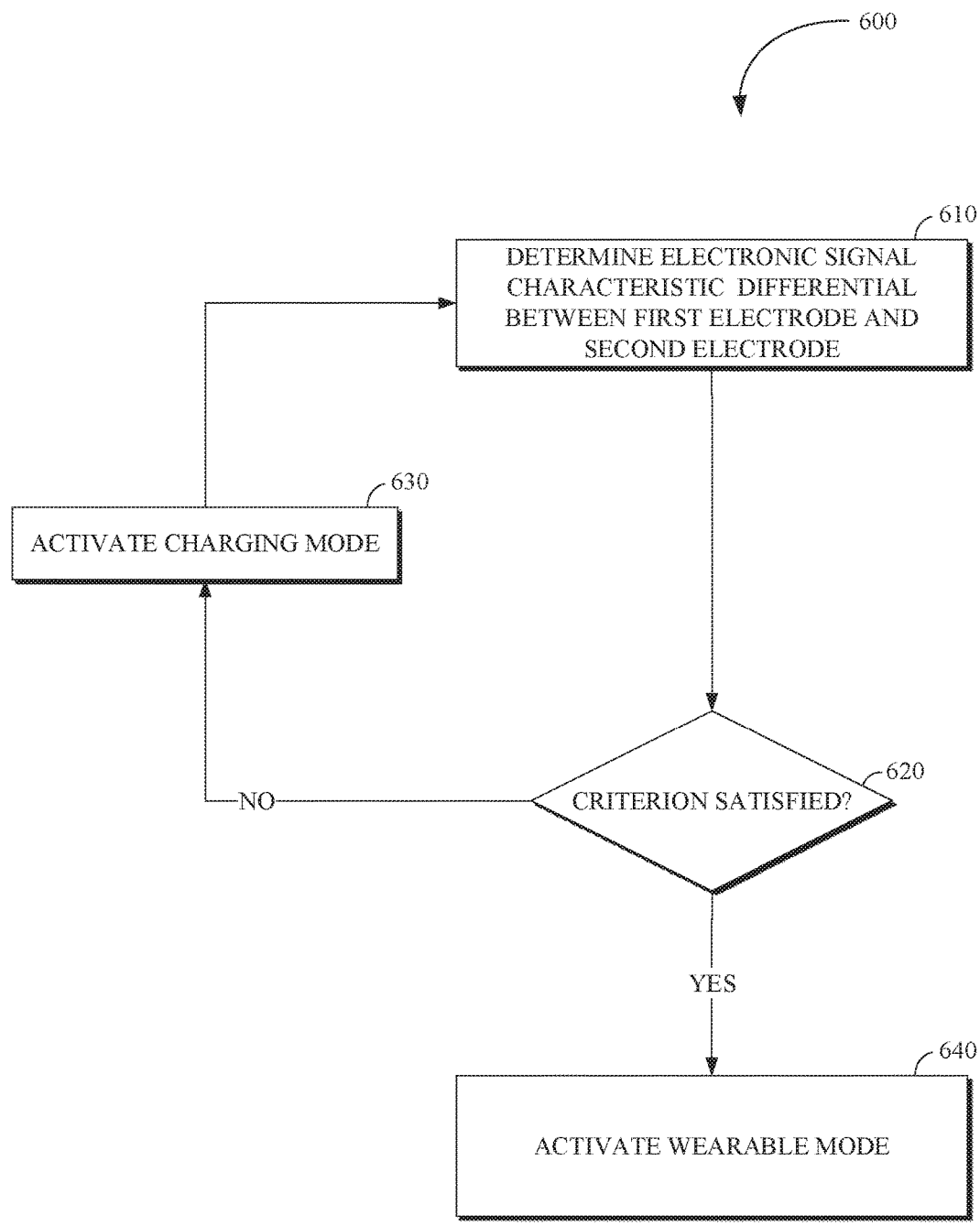
FIG. 6 is a flowchart showing an implementation of a process for activating a wearable mode in an apparatus using multiple electrodes according to implementations of this disclosure.

In some implementations, the wearable mode can be activated based on a comparison result of the counts per sensing cycle in a predetermined time period to a capacitance threshold, such as, for example, a sensing cycle count threshold (e.g., exceeding, falling beneath, or equaling the sensing cycle count threshold). An example of activating the wearable mode is shown in FIG. 6.

In an implementation, the capacitance values can be based on counts per sensing cycle output by a CDC. In some implementations, responsive to activating the wearable mode, the wearable apparatus 110 can continuously monitor capacitance through the capacitance detection sensor. For example, a CDC can be used to monitor the counts per sensing cycle. In the event that the counts per sensing cycle of the one or more electrodes is less than the capacitance threshold for a predetermined time period, the detection apparatus can deactivate the wearable mode.

As an example, in a CDC, a capacitance detection sensor can determine when the detected capacitance falls below the capacitance threshold. Upon falling below the capacitance threshold, a timer can be activated to determine when a predetermined time period has elapsed. The timer elapsing before the capacitance rises above the capacitance threshold may indicate that the one or more electrodes are no longer in contact with a source of capacitance such as a human body.

In some implementations, responsive to the capacitance sensor detecting that the capacitance has changed by a predetermined amount, the wearable apparatus 110 can deactivate the wearable mode and can switch to a different mode including at least one of: a sleeping mode during which an electronic signal characteristic of one or more electrodes, such as described in operation 510, can be determined; a mode that terminates any application associated with the wearable mode; and the capacitance detection mode In some implementations, following activation of the wearable mode, other sensors (e.g., a motion sensor, an optical sensor, or a resistance sensor) can be used to improve accuracy of the determining when to activate the capacitance detection mode.

FIG. 6 is a flow diagram showing an example of a process 600 for activating a wearable mode for a wearable apparatus using multiple electrodes according to implementations of this disclosure. In some implementations, some or all of the process 600 can be implemented in a device or apparatus including at least one of: the wearable apparatus 110, shown in FIG. 1, the wearable apparatus 200 shown in FIG. 2, and the computing device 300 shown in FIG. 3.

At operation 610, an electronic signal characteristic differential between two or more electrodes is determined. As an example, the electronic signal characteristic differential can be based on voltages including a difference between the respective voltages of the two or more electrodes. In some implementations, the electronic signal characteristic differential can be between a first electronic signal characteristic of a first electrode and a second electronic signal characteristic of a second electrode. As an example, by determining the electronic signal characteristic differential based on the output of two or more electrodes, false positive detection of a non-wearing state (e.g. deactivation of the wearable mode) can be reduced or avoided.

At operation 620, the electronic signal characteristic differential between the first electrode and the second electrode is compared to an electronic signal characteristic differential threshold to determine whether the electronic signal characteristic differential satisfies an electronic signal characteristic differential criterion such as exceeding an electronic signal characteristic differential threshold (e.g. exceeding a threshold voltage).

Responsive to the electronic signal characteristic differential satisfying the electronic signal characteristic differential criterion, the process 600 proceeds to operation 640.

Responsive to the electronic signal characteristic differential not exceeding the electronic signal characteristic differential threshold, the process 600 proceeds to operation 630.

At operation 630, a charging mode is activated. As an example, activating the charging mode can include opening a gate between the two or more electrodes and a power source, such as a battery (e.g., a battery in the wearable apparatus 110). Opening the gate between the two or more electrodes and the power source (e.g. a battery) permits a signal, such as an electrical current, to charge the power source. After the charging mode is activated, the process 600 returns to operation 610.

At operation 640, a wearable mode is activated. As an example, activating the wearable mode can include switching a charging circuit to a different circuit, such as a capacitance detection circuit. In this way, an apparatus such as the wearable apparatus 110 can determine when the wearable apparatus is being worn by a human user.

FIG. 7 is a flow diagram showing an example of a process 700 for deactivating a charging mode for a wearable apparatus according to implementations of this disclosure. In some implementations, some or all of the process 700 can be implemented in a device or apparatus including at least one of: the wearable apparatus 110, shown in FIG. 1, the wearable apparatus 200 shown in FIG. 2, and the computing device 300 shown in FIG. 3.

At operation 710, responsive to the charging mode being activated, a signal such as an electric current, is drawn through the one or more electrodes to charge a power source (e.g., a power source of the wearable apparatus 110) such as a battery. Activation of the charging mode can be contingent on the signal (e.g., the electric current) being within a predetermined electric current range. As an example, the charging mode can be activated when a signal within a predetermined amperage range is detected.

At operation 720, a determination of whether charging of the power source is complete is performed. For example, an electronic signal characteristic differential between a first electrode and a second electrode can be determined. Responsive to the determined electronic signal characteristic differential being within an electronic signal characteristic threshold, charging of the power source can be determined to be complete. Responsive to determining that the charging of the battery is complete, the process 700 proceeds to operation 730. Responsive to determining that the charging mode is not completed, the process 700 returns to operation 710.

At operation 730, the charging mode is deactivated. Deactivation of the charging mode includes a cessation of the drawing of the signal (e.g., electric current) through the one or more electrodes. Accordingly, charging of an apparatus such as the wearable apparatus 110 can be stopped when the battery in the wearable apparatus 110 is fully charged, thereby preserving the efficacy of the battery.

FIG. 8 is a flow diagram showing an example of a process 800 for delaying deactivation of a wearable mode for a wearable apparatus according to implementations of this disclosure. In some implementations, some or all of the process 800 can be implemented in a device or apparatus including at least one of: the wearable apparatus 110, shown in FIG. 1, the wearable apparatus 200 shown in FIG. 2, and the computing device 300 as shown in FIG. 3.

At operation 810, sensor data are received. The sensor data can include at least one of: motion sensor data from a motion sensor; and optical sensor data from an optical sensor. The motion sensor data or the optical sensor data can include a plurality of motion magnitude values based on movement detected by the motion sensor or the optical sensor.

In some implementations, the motion sensor data can be based on motion sensor inputs to a motion sensor including at least one of changes in an orientation, direction, position, velocity, and acceleration of the sensor. In some implementations, the optical sensor data can be based on optical sensor inputs to an optical sensor including any form of electromagnetic radiation. For example, the optical sensor can detect changes in different frequencies and wavelengths of the electromagnetic spectrum.

At operation 820, a determination of whether one or more delay criteria have been satisfied is performed. The delay criteria can include at least one of whether the wearable mode is activated and whether the motion magnitude threshold is exceeded. As an example, once the CDC has been activated, a wearable mode indicator (e.g., a wearable mode flag) can be set to indicate that the wearable mode has been activated. In some implementations, the wearable mode flag can include at least one of: an activated state to indicate that the wearable mode is active and that the capacitance detection sensor is detecting capacitance; and a deactivated state to indicate that the wearable mode is not active (deactivated) and that the capacitance detection sensor is not detecting capacitance. In this way, the wearable mode can be indicated without continuously detecting body capacitance.

In some implementations, determining whether the motion magnitude threshold is exceeded can include a comparison of one or more of the motion magnitude values to the motion magnitude threshold value. The comparison of the motion magnitude values to the motion magnitude threshold can include at least one of: comparing individual motion magnitude values to the motion magnitude threshold; and comparing an average of the motion magnitude values, including a mean, mode, or median value of the motion magnitude values, to the motion magnitude threshold. In some implementations, satisfying the delay criterion can include determining whether the motion magnitude value is equal to the motion magnitude threshold.

Responsive to the activating of the wearable mode and at least one of the plurality of motion magnitude values exceeding a motion magnitude threshold, process 800 proceeds to operation 830. Responsive to at least one of the wearable mode not being activated and at least one of the plurality of motion magnitude values not exceeding the motion magnitude threshold, the process 800 returns to operation 810.

At operation 830, deactivation of a wearable mode is delayed for a predetermined time period. As an example, in response to the delay criteria being satisfied, deactivation of the wearable mode can be delayed for a period of five seconds, during which time, even if the one or more electrodes do not contact the skin, the wearable mode will be maintained as long as contact between the one or more electrodes and the skin is resumed within the predetermined time period.

FIG. 9 is a flow diagram showing an example of a process 900 for detection of body capacitance. In some implementations, some or all of the process 900 can be implemented in a device or apparatus including at least one of: the wearable apparatus 110, shown in FIG. 1; the wearable apparatus 200 shown in FIG. 2; and the computing device 300 in FIG. 3.

At operation 910, in response to determining that the wearable mode is activated, a plurality of capacitance values is generated based on the capacitance of the one or more electrodes over a predetermined time period. As an example, the capacitance sensor can detect a capacitance (e.g., skin contact) and generate the plurality of capacitance values to indicate the magnitude of the capacitance (e.g., in picofarads) or a count per sensing cycle over the predetermined time period (e.g., ten seconds).

At operation 920, an average capacitance value can be determined based on the average of the plurality of capacitance values over the predetermined time period. In some implementations, the capacitance threshold can be based at least in part on the average capacitance value. In this way, the capacitance threshold can be modified over time in response to changes in the capacitance of objects that come into contact with the one or more electrodes. As an example, skin capacitance can change based on the moisture or dryness of the skin surface or the surface of the one or more electrodes. As such, adaptively modifying the capacitance threshold can result in more accurate determination of a body capacitance and more efficient activation (e.g., fewer false positive indications of detected body capacitance) of the wearable mode.

FIG. 10 is a flow diagram showing an example of a process 1000 for adaptively modifying a capacitance threshold according to implementations of this disclosure. In some implementations, some or all of the process 1000 can be implemented in a device or apparatus including at least one of: the wearable apparatus 110, shown in FIG. 1; the wearable apparatus 200 shown in FIG. 2; and the computing device 300 in FIG. 3.

At operation 1010, in response to determining that the wearable mode is activated, a motion profile based on motion data of a wearer (e.g. a human user) is generated. The motion profile can include features or characteristics of motion detected by a motion sensor, including at least one of: a direction of motion; a velocity of motion; an acceleration of motion; and changes in motion detected by an optical sensor. Features or characteristics of the motion data can be extracted and used separately or in combination to create the motion profile. In this way, patterns of the motion data can be associated with the wearer and the capacitance values associated with the wearer, accordingly.

At operation 1020, a capacitance threshold can be modified based at least in part on the motion profile. For example, if the wearable apparatus is worn by the first wearer and a second wearer, with different average capacitance values (e.g., the average capacitance value) and different capacitance value ranges for the first and second wearers, using a same capacitance threshold could result in incorrect activation or deactivation of the wearable mode. In this example, generating a motion profile for each wearer and modifying the capacitance threshold based on the respective motion profiles for the first and second wearers can improve accuracy of wearing state detection by conforming the capacitance threshold to an inferred identity of the wearer based on the motion profile.

As illustrated above, the disclosed technology can provide more effective ways to detect body capacitance and to distinguish between the electrical current produced by a human body and a device, such as an electronic device. The selective activation of a device charging mode and a wearable mode can improve the efficiency of device operation by minimizing the time spent manually switching between modes.

The aspects herein can be described in terms of functional block components and various processing operations. Such functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices.

Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of techniques for electronics configuration, signal processing and/or control, data processing and the like. The words "mechanism" and "element" are used broadly and are not limited to mechanical or physical embodiments or aspects, and can include software routines in conjunction with processors and other electronic computing devices.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the disclosure can be implemented using machine readable instructions in the form of code for operation of any or any combination of the aforementioned computational hardware. Computational code can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

While the disclosure has been described in connection with certain embodiments and implementations, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

As used in this disclosure, an initial element described by a word or phrase, followed by the phrase "includes at least one of" and one or more additional elements described by one or more words or phrases (which can also include the term "and") can be construed to mean that the initial element includes any combination of the one or more additional elements. For example, the statement "X includes at least one of A and B" can mean: the initial element X can include the additional element A; the initial element X can include the additional element B; or that the initial element X can include both of the additional element A and the additional element B.

It is to be understood that the present disclosure is not to be limited to the disclosed implementations but, on the contrary, is intended to cover various modifications and equivalent arrangements included within the scope of the appended claims.

What is claimed is:

1. A method for determining a wearing state based on capacitance, the method comprising:
   determining, by a detection apparatus, an electronic signal characteristic of one or more electrodes;

responsive to the electronic signal characteristic being outside a predetermined electronic signal characteristic range, activating, by the detection apparatus, a charging mode,
wherein, in the charging mode, the detection apparatus draws an electric current through the one or more electrodes to charge a battery;
responsive to the electronic signal characteristic of the one or more electrodes being within the predetermined electronic signal characteristic range, activating, by the detection apparatus, a capacitance detection mode, wherein the capacitance detection mode includes:
determining, by the detection apparatus, a capacitance value of the one or more electrodes, wherein the capacitance value is based on a frequency of change in a capacitance associated with the one or more electrodes;
responsive to the capacitance value of the one or more electrodes exceeding a capacitance threshold, activating, by the detection apparatus, a wearable mode;
receiving, by the detection apparatus, motion sensor data from a motion sensor or optical sensor data from an optical sensor, wherein the motion sensor data or the optical sensor data includes a plurality of motion magnitude values based on movement detected by the motion sensor or the optical sensor; and
responsive to the wearable mode being active, the one or more electrodes not being in contact with a skin of a wearer of the detection apparatus, and at least one of the plurality of motion magnitude values exceeding a motion magnitude threshold, delaying, by the detection apparatus, the deactivating of the wearable mode for a predetermined time period.

2. The method of claim 1, wherein the one or more electrodes include a first electrode and a second electrode and further comprising:
determining, by the detection apparatus, an electronic signal characteristic differential between an electronic signal characteristic of the first electrode and an electronic signal characteristic of the second electrode; and
responsive to the electronic signal characteristic differential exceeding an electronic signal characteristic differential threshold, activating, by the detection apparatus, the wearable mode for a predetermined period of time.

3. The method of claim 1, wherein the electric current is within a predetermined electric current range.

4. The method of claim 3, further comprising:
responsive to determining that the charging of the battery is complete, deactivating, by the detection apparatus, the charging mode, wherein the deactivating includes cessation of the drawing of the electric current through the one or more electrodes.

5. The method of claim 1, further comprising:
generating, by the detection apparatus, a motion profile based on the plurality of motion magnitude values; and
modifying, by the detection apparatus, the capacitance threshold based at least in part on the motion profile.

6. The method of claim 1, further comprising:
responsive to the activating of the wearable mode, generating, by the detection apparatus, a plurality of capacitance values based on the capacitance value of the one or more electrodes over a predetermined time period; and
determining, by the detection apparatus, an average capacitance value based on an average of the plurality of capacitance values over the predetermined time period, wherein the capacitance threshold is based at least in part on the average capacitance value.

7. The method of claim 1, further comprising:
determining, by the detection apparatus, a first capacitance value based on a plurality of capacitance values in a first time period, and a second capacitance value based on a plurality of capacitance values in a second time period; and
determining, by the detection apparatus, a noise value based on a difference between the first capacitance value and the second capacitance value, wherein the capacitance threshold is based at least in part on the noise value.

8. The method of claim 1, further comprising:
responsive to the activating of the wearable mode and the capacitance value of the one or more electrodes being less than the capacitance threshold for a predetermined time period, deactivating, by the detection apparatus, the wearable mode.

9. The method of claim 1, wherein the one or more electrodes are inside an enclosure and are not in contact with a source of the electronic signal characteristic or the capacitance value.

10. A capacitance detection apparatus, comprising:
one or more sensors configured to detect motion and electronic signals;
a memory and a processor configured to execute instructions stored in the memory to:
determine an electronic signal characteristic of one or more electrodes;
responsive to the electronic signal characteristic being outside a predetermined electronic signal characteristic range, activate a charging mode to draw an electric current through the one or more electrodes to charge a battery;
responsive to the electronic signal characteristic of the one or more electrodes being within the predetermined electronic signal characteristic range, activate a capacitance detection mode, wherein the capacitance detection mode includes:
determine a capacitance value of the one or more electrodes, wherein the capacitance value is based on a frequency of change in a capacitance associated with the one or more electrodes; and
responsive to the capacitance value of the one or more electrodes exceeding a capacitance threshold, activate a wearable mode;
receive motion sensor data from a motion sensor or optical sensor data from an optical sensor, wherein the motion sensor data or the optical sensor data includes a plurality of motion magnitude values based on movement detected by the motion sensor or the optical sensor;
responsive to the activating of the charging mode and at least one of the plurality of motion magnitude values exceeding a motion magnitude threshold, delay the deactivating of the wearable mode for a predetermined time period;
generate a motion profile based on the plurality of motion magnitude values; and
modify the capacitance threshold based at least in part on the motion profile.

11. The apparatus of claim 10, wherein the one or more electrodes include a first electrode and a second electrode and further comprising and the processor is further configured to execute instructions stored in the memory to:

determine an electronic signal characteristic differential between an electronic signal characteristic of the first electrode and a second electronic signal characteristic of the second electrode; and responsive to the electronic signal characteristic differential exceeding an electronic signal characteristic differential threshold, activate the wearable mode for a predetermined period of time.

12. The apparatus of claim 10, wherein the electric current is within a predetermined electric current range.

13. The apparatus of claim 12, wherein the processor is further configured to execute instructions stored in the memory to:

responsive to determining that the charging of the battery is complete, deactivate the charging mode, wherein the deactivating includes cessation of the drawing of the electric current through the one or more electrodes.

14. The apparatus of claim 10, wherein the processor is further configured to execute instructions stored in the memory to:

responsive to the activating of the wearable mode, generate a plurality of capacitance values based on the capacitance value of the one or more electrodes over a predetermined time period; and determine an average capacitance value based on an average of the plurality of capacitance values over the predetermined time period, wherein the capacitance threshold is based at least in part on the average capacitance value.

15. The apparatus of claim 10, wherein the processor is further configured to execute instructions stored in the memory to:

determine a first capacitance value based on a plurality of capacitance values in a first time period, and a second capacitance value based on a plurality of capacitance values in a second time period; and determine a noise value based on a difference between the first capacitance value and the second capacitance value, wherein the capacitance threshold is based at least in part on the noise value.

16. A detection system, comprising:

a computing device; and a detection apparatus comprising one or more sensors configured to detect electronic signal characteristics, a communication component configured to exchange signal data with the computing device, a memory, and a processor configured to execute instructions stored in the memory to:

determine an electronic signal characteristic of one or more electrodes;

responsive to the electronic signal characteristic being outside a predetermined electronic signal characteristic range, activate a charging mode to draw an electric current through the one or more electrodes to charge a battery; and responsive to the electronic signal characteristic of the one or more electrodes being within the predetermined electronic signal characteristic range, activate a capacitance detection mode, wherein the capacitance detection mode includes:

determine a capacitance value of the one or more electrodes, wherein the capacitance value is based on a frequency of change in a capacitance associated with the one or more electrodes; and responsive to the capacitance value of the one or more electrodes exceeding a capacitance threshold, activate a wearable mode;

receive motion sensor data from a motion sensor or optical sensor data from an optical sensor, wherein the motion sensor data or the optical sensor data includes a plurality of motion magnitude values based on movement detected by the motion sensor or the optical sensor; and responsive to the wearable mode being active, the one or more electrodes not being in contact with a skin of a wearer of the detection apparatus, and at least one of the plurality of motion magnitude values exceeding a motion magnitude threshold, delay the deactivating of the wearable mode for a predetermined time period.

* * * * *